US011570658B2

United States Patent
Wu et al.

(10) Patent No.: US 11,570,658 B2
(45) Date of Patent: Jan. 31, 2023

(54) TRIGGERING A BUFFER STATUS REPORT (71) Applicant: LENOVO (BEIJING) LIMITED, Beijing (CN)

(72) Inventors: Lianhai Wu, Beijing (CN); Joachim Loehr, Wiesbaden (DE); Prateek Basu Mallick, Dreieich (DE); Haiming Wang, Beijing (CN); Jing Han, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/275,185

(22) PCT Filed: Sep. 27, 2018

(86) PCT No.: PCT/CN2018/108005
§ 371 (c)(1),
(2) Date: Mar. 10, 2021

(87) PCT Pub. No.: WO2020/061917
PCT Pub. Date: Apr. 2, 2020

(65) Prior Publication Data
US 2022/0046463 A1    Feb. 10, 2022

(51) Int. Cl.
*H04W 28/02* (2009.01)
(52) U.S. Cl.
CPC .............. *H04W 28/0278* (2013.01)
(58) Field of Classification Search
CPC ............ H04W 28/0278; H04W 72/1284
See application file for complete search history.

(56) References Cited

U.S. PATENT DOCUMENTS

| 2009/0221281 | A1* | 9/2009 | Tseng | H04W 72/1284 |
| | | | | 455/423 |
| 2010/0070814 | A1* | 3/2010 | Damnjanovic | G06F 17/16 |
| | | | | 714/809 |
| 2010/0088236 | A1* | 4/2010 | Karabulut | G06F 21/335 |
| | | | | 705/59 |
| 2011/0242972 | A1* | 10/2011 | Sebire | H04W 28/0278 |
| | | | | 370/229 |

(Continued)

FOREIGN PATENT DOCUMENTS

| CN | 104702331 A | 6/2015 |
| CN | 108513323 A | 9/2018 |

OTHER PUBLICATIONS

International Searching Authority, "Notification of Transmittal of the International Search Report and the Written Opinion of the International Searching Authority, or the Declaration", PCT/CN2018/108005, dated Sep. 27, 2018, pp. 1-7.

(Continued)

*Primary Examiner* — Dinh Nguyen
(74) *Attorney, Agent, or Firm* — Kunzler Bean & Adamson (57) ABSTRACT

Apparatuses, methods, and systems are disclosed for triggering a buffer status report. One method (700) includes determining (702) to transmit a buffer status report corresponding to uplink data in response to a trigger condition. The method (700) includes, in response to determining to transmit the buffer status report, transmitting (704) the buffer status report to a parent integrated access backhaul device.

16 Claims, 7 Drawing Sheets

(56) References Cited

U.S. PATENT DOCUMENTS

| | | | |
|---|---|---|---|
| 2011/0261747 A1* | 10/2011 | Wang | H04W 40/22 370/315 |
| 2011/0269393 A1* | 11/2011 | Ostergaard | H04B 7/155 455/7 |
| 2012/0033628 A1* | 2/2012 | Eriksson | H04W 72/1284 370/329 |
| 2012/0120831 A1* | 5/2012 | Gonsa | H04W 76/15 370/252 |
| 2016/0044734 A1* | 2/2016 | Park | H04W 76/16 370/331 |
| 2016/0234714 A1* | 8/2016 | Basu Mallick | H04W 28/085 |
| 2017/0064731 A1 | 3/2017 | Wang et al. | |
| 2018/0092139 A1 | 3/2018 | Novlan et al. | |
| 2018/0270722 A1 | 9/2018 | Kim et al. | |
| 2020/0092808 A1* | 3/2020 | Beale | H04W 52/0235 |

OTHER PUBLICATIONS

ZTE, Discussion on flow control IAB, 3GPP TSG-RAN WG2 Meeting #103, R2-1812463, Gothenburg, Sweden, Aug. 20-24, 2018, pp. 1-5.

Huawei, QoS Management of IAB nodes, 3GPP TSG-RAN WG3#101, R3-184867, Gothenburg, Sweden, Aug. 20-24, 2018, pp. 1-8.

* cited by examiner

TRIGGERING A BUFFER STATUS REPORT

FIELD

The subject matter disclosed herein relates generally to wireless communications and more particularly relates to triggering a buffer status report.

BACKGROUND

The following abbreviations are herewith defined, at least some of which are referred to within the following description: Third Generation Partnership Project ("3GPP"), Acknowledge Mode ("AM"), Backhaul ("BH"), Broadcast Multicast ("BM"), Buffer Occupancy ("BO"), Base Station ("BS"), Bandwidth Part ("BWP"), Component Carrier ("CC"), Coordinated Multipoint ("CoMP"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Prioritization ("LCP"), Long Term Evolution ("LTE"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), Packet Switched ("PS"), Quasi Co-Located ("QCL"), Quality of Service ("QoS"), Radio Access Network ("RAN"), Radio Access Technology ("RAT"), Resource Element ("RE"), Rank Indicator ("RI"), Radio Link Failure ("RLF"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Service Data Unit ("SDU"), Subscriber Identity Module ("SIM"), Signal-to-Interference and Noise Ratio ("SINR"), Sequence Number ("SN"), Synchronization Signal ("SS"), SS/PBCH Block ("SSB"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Voice Over IP ("VoIP"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, buffer status reports may be sent. In such networks, a device may not know when to send a buffer status report.

BRIEF SUMMARY

Methods for triggering a buffer status report are disclosed. Apparatuses and systems also perform the functions of the apparatus. In one embodiment, the method includes determining to transmit a buffer status report corresponding to uplink data in response to a trigger condition. In certain embodiments, the method includes, in response to determining to transmit the buffer status report, transmitting the buffer status report to a parent integrated access backhaul device.

An apparatus for triggering a buffer status report, in one embodiment, includes a processor that determines to transmit a buffer status report corresponding to uplink data in response to a trigger condition. In various embodiments, the apparatus includes a transmitter that, in response to determining to transmit the buffer status report, transmits the buffer status report to a parent integrated access backhaul device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
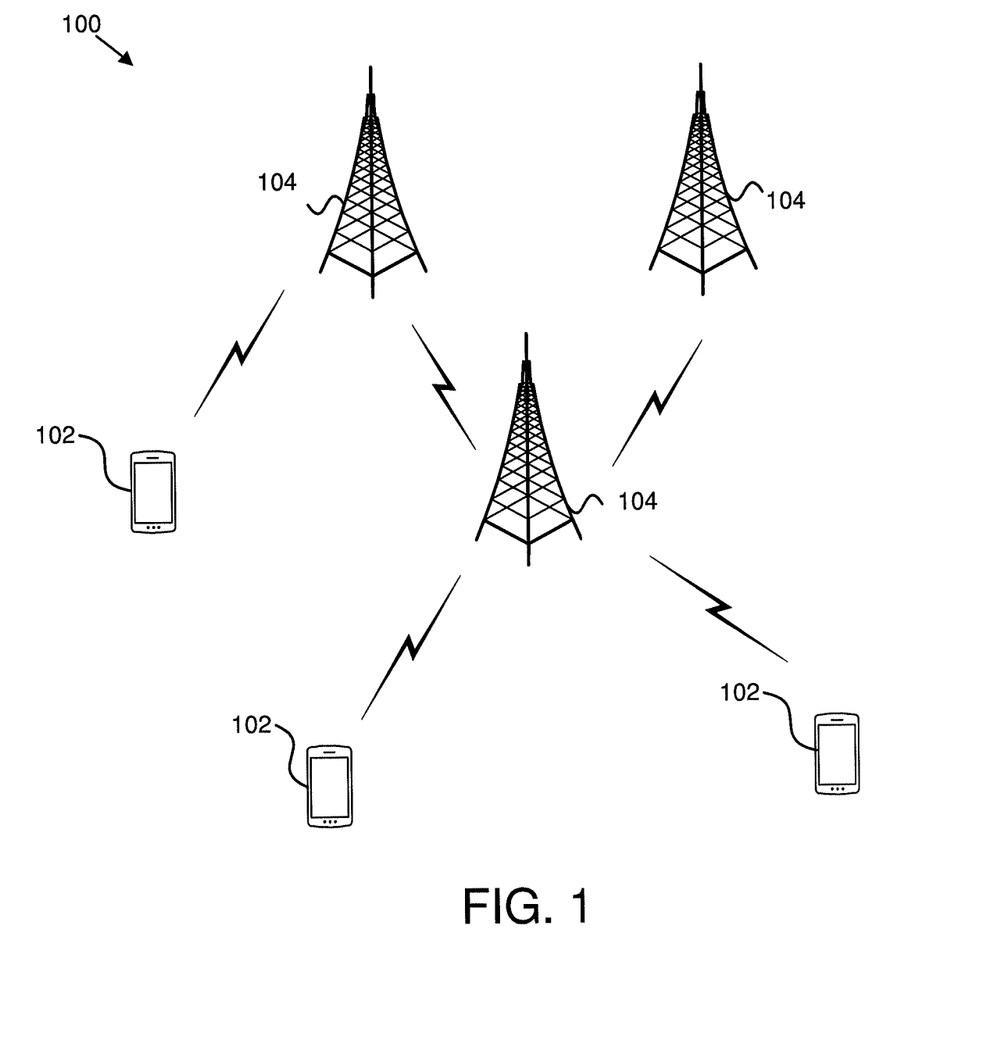
FIG. 1 is a schematic block diagram illustrating one embodiment of a wireless communication system for triggering a buffer status report.

FIG. 1 depicts an embodiment of a wireless communication system 100 for triggering a buffer status report. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may trigger a buffer status report. In various embodiments, the remote unit 102 may determine to transmit a buffer status report corresponding to uplink data in response to a trigger condition. In certain embodiments, the remote unit 102 may, in response to determining to transmit the buffer status report, transmit the buffer status report to a parent integrated access backhaul device. Accordingly, a remote unit 102 may be used for triggering a buffer status report.

In various embodiments, a network unit 104 may trigger a buffer status report. In various embodiments, the network unit 104 may determine to transmit a buffer status report corresponding to uplink data in response to a trigger condition. In certain embodiments, the network unit 104 may, in response to determining to transmit the buffer status report, transmit the buffer status report to a parent integrated access backhaul device. Accordingly, a network unit 104 may be used for triggering a buffer status report.

Figure 2:
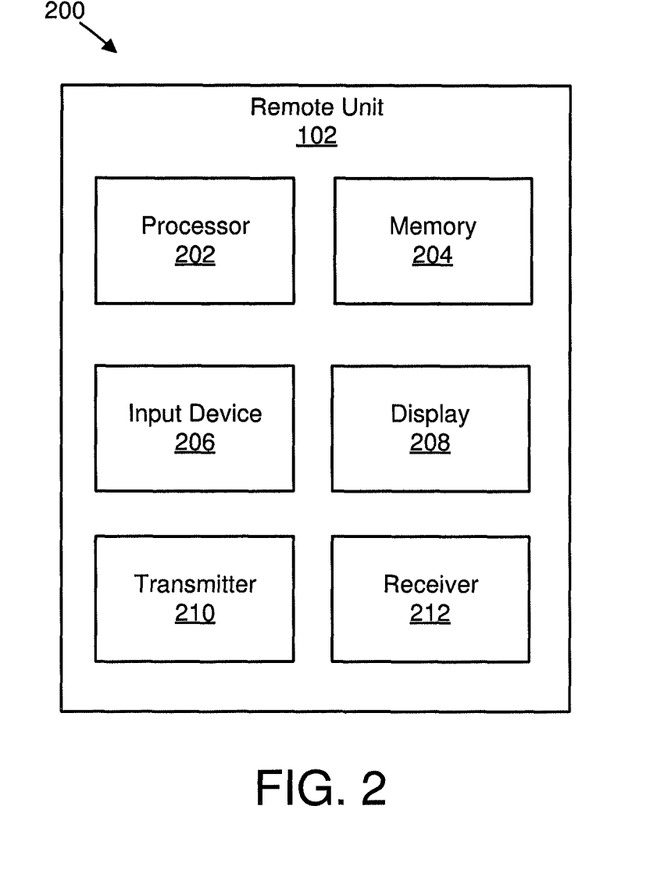
FIG. 2 is a schematic block diagram illustrating one embodiment of an apparatus that may be used for triggering a buffer status report.

FIG. 2 depicts one embodiment of an apparatus 200 that may be used for triggering a buffer status report. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 determine to transmit a buffer status report corresponding to uplink data in response to a trigger condition. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In some embodiments, the transmitter 210 may, in response to determining to transmit a buffer status report, transmit the buffer status report to a parent integrated access backhaul device. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
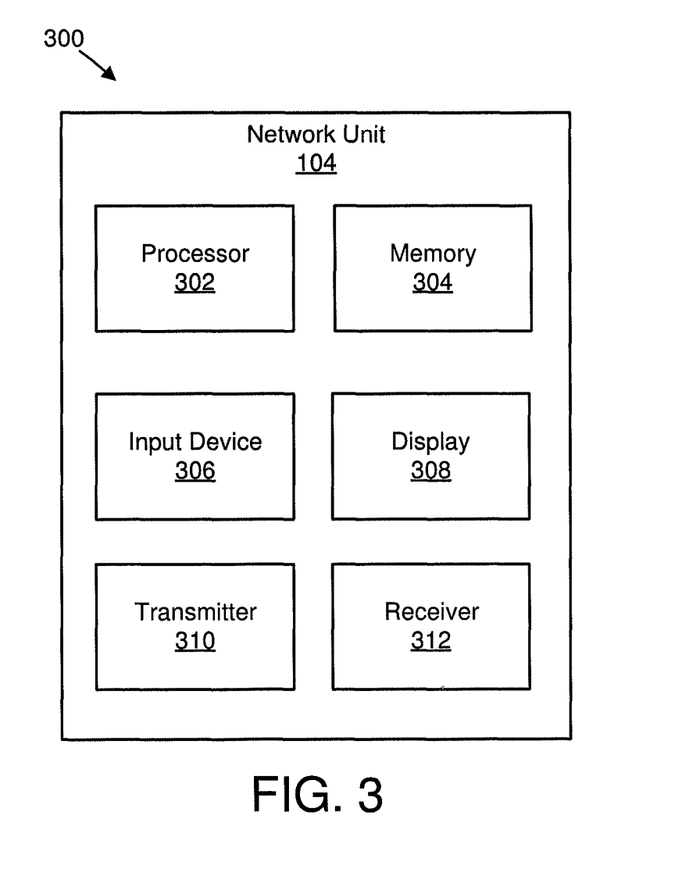
FIG. 3 is a schematic block diagram illustrating one embodiment of an apparatus that may be used for triggering a buffer status report.

FIG. 3 depicts one embodiment of an apparatus 300 that may be used for triggering a buffer status report. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 determines to transmit a buffer status report corresponding to uplink data in response to a trigger condition. In various embodiments, the transmitter 310, in response to determining to transmit the buffer status report, transmits the buffer status report to a parent integrated access backhaul device.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
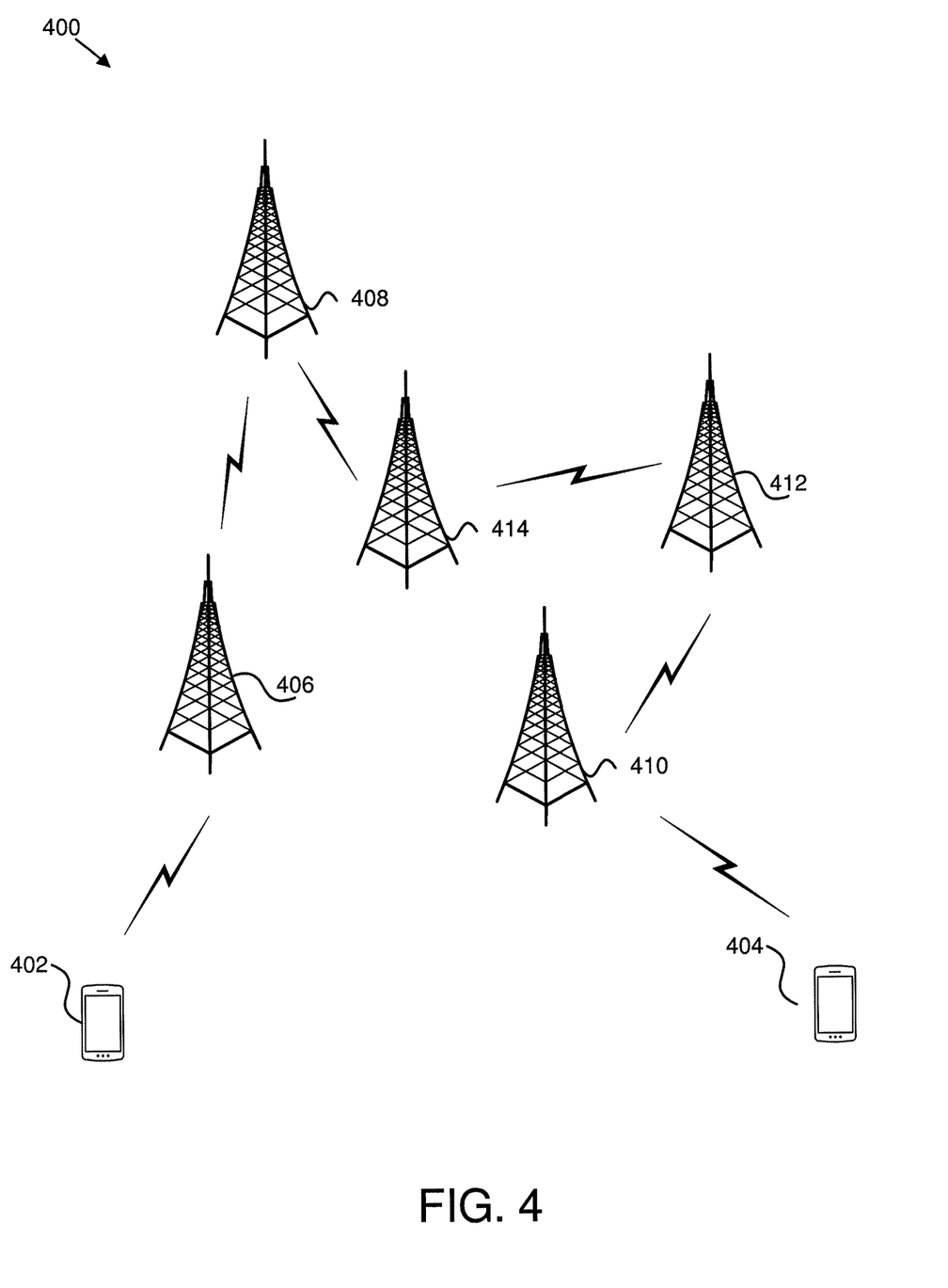
FIG. 4 is a schematic block diagram illustrating one embodiment of an integrated access backhaul system.

FIG. 4 is a schematic block diagram illustrating one embodiment of an integrated access backhaul ("IAB") system 400. The IAB system 400 includes a first UE 402, a second UE 404, a first IAB node 406, an IAB donor node 408, a second IAB node 410, a third IAB node 412, and a fourth IAB node 414. As illustrated, the first UE 402 is connected to the IAB donor node 408 via the first IAB node 406. Moreover, the second UE 404 is connected to the IAB donor node 408 via the second IAB node 410, the third IAB node 412, and the fourth IAB node 414. The IAB system 400, as illustrated, may be used for multi-hop backhauling via multiple IAB nodes.

As may be appreciated, multi-hop backhauling systems may provide a larger range extension than single hop systems. This may especially be beneficial for frequencies above 6 GHz due to a limited range of such frequencies. In some configurations, multi-hop backhauling enables backhauling around obstacles (e.g., buildings).

A maximum number of hops in a deployment may depend on many factors such as frequency, cell density, propagation environment, and traffic load. Thus, flexibility in hop count may be desirable. With an increased number of hops, scalability issues may arise, performance may be limited, and/or signaling load may increase signaling load to undesirable levels.

As may be appreciated, wireless backhaul links may be vulnerable to blockage (e.g., due to moving objects such as vehicles, due to seasonal changes (foliage), due to infrastructure changes (new buildings), and so forth). Such vulnerability may also apply to physically stationary IAB-nodes. In FIG. 4, the first UE 402 may switch from communicating via the first IAB node 406 to communicating with the second IAB node 410 if a backhaul link is blocked by objects (e.g., moving objects). Moreover, traffic variations may create uneven load distribution on wireless backhaul links leading to local link congestion and/or node congestion.

In some embodiments, an IAB node may include MT and DU. The MT function may be a component of a mobile equipment, or, as used herein, MT may be a function residing on an IAB node that terminates radio interface layers of a backhaul Uu interface toward the IAB-donor or other IAB nodes.

In various embodiments, a gNB may include a gNB-CU and one or more gNB-DUs. Moreover, a gNB-CU and a gNB-DU may be connected via an F1 interface. A gNB-CU may be a gNB central unit that is a logical node hosting RRC, SDAP, and PDCP protocols of the gNB. Furthermore, a gNB-DU may be a gNB distributed unit that is a logical node hosting RLC, MAC, and PHY layers of the gNB. In some embodiments, one cell is supported by only one gNB-DU.

In FIG. 4 the IAB nodes may be in a standalone mode which includes one IAB-donor and multiple IAB-nodes. The IAB-donor node 408 may be treated as a single logical node that includes a set of functions such as gNB-DU, gNB-CU-CP, gNB-CU-UP and potentially other functions. In certain embodiments, the IAB-donor node 408 may be split according to its functions which can all be either collocated or non-collocated as allowed by 3GPP NG-RAN architecture.

In some embodiments, an IAB node may multiplex UE DRBs to BH RLC-channels. Various options may be considered for bearer mapping in an IAB node as illustrated in FIGS. 5 and 6.

Figure 5:
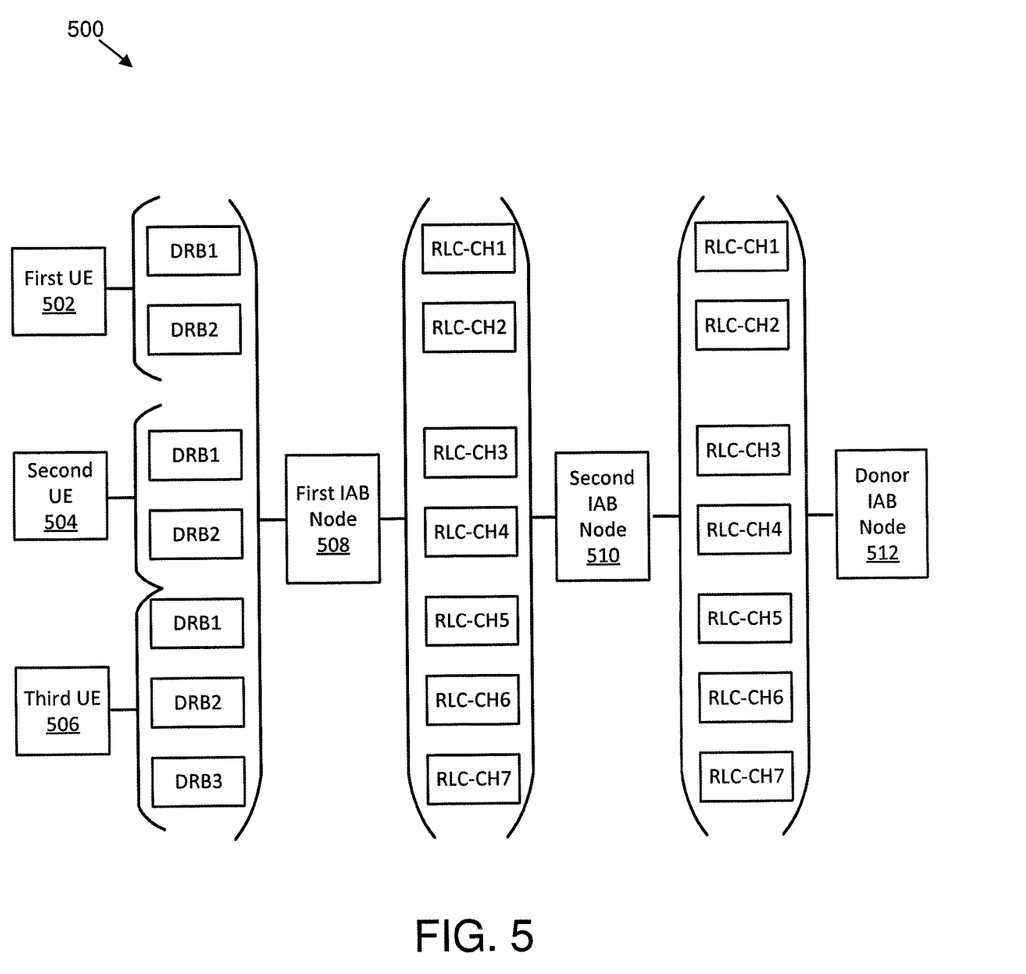
FIG. 5 is a schematic block diagram illustrating one embodiment of a system using one-to-one mapping.
Figure 6:
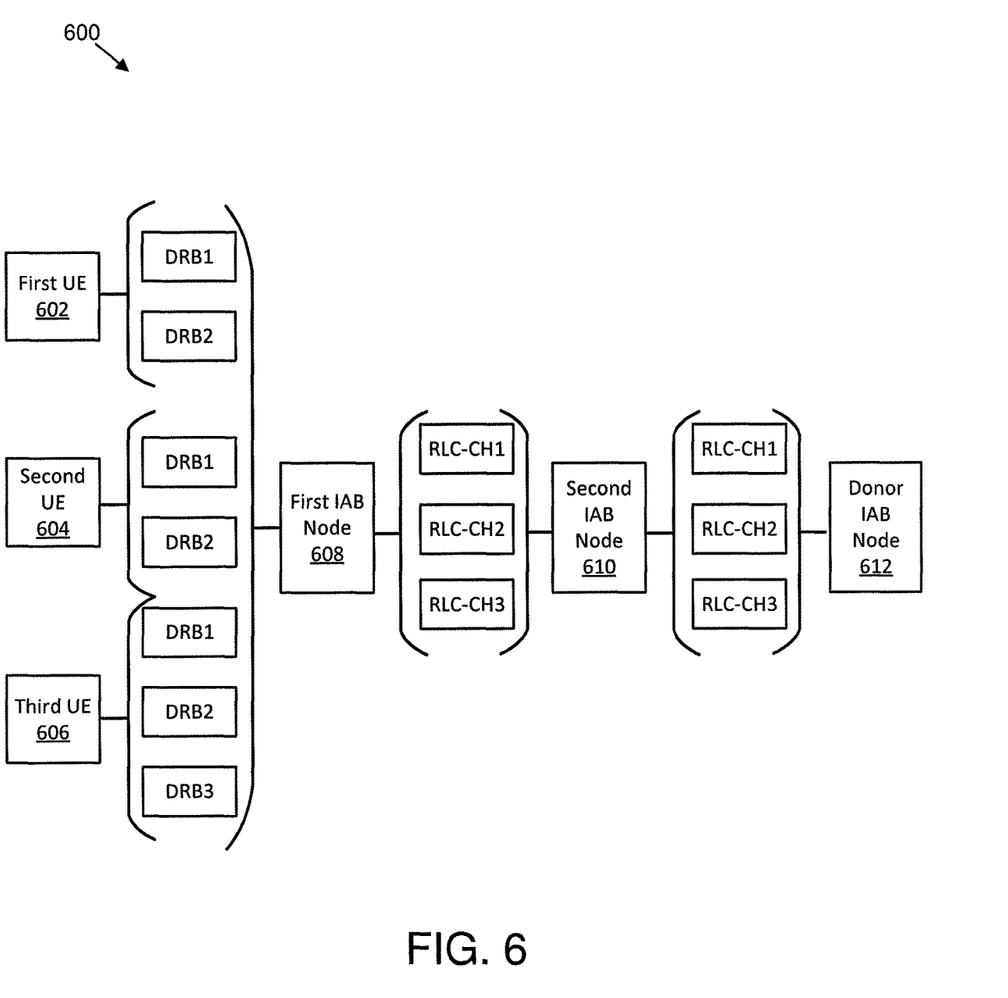
FIG. 6 is a schematic block diagram illustrating one embodiment of a system using many-to-one mapping.

FIG. 5 is a schematic block diagram illustrating one embodiment of a system 500 using one-to-one mapping. The system 500 includes a first UE 502 (e.g., UE1), a second UE 504 (e.g., UE2), a third UE 506 (e.g., UE3), a first IAB node 508, a second IAB node 510, and a donor IAB node 512. In this one-to-one mapping between UE DRBs and BH RLC-channels, each DRB from the UEs is mapped to a separate RLC channel. For example, DRB1 (e.g., VoIP) corresponding to the first UE 502 may be mapped to RLC-CH1 (e.g., RLC-Channel 1=UE1 DRB1), DRB2 (e.g., streaming) corresponding to the first UE 502 may be mapped to RLC-CH2 (e.g., RLC-Channel 2=UE1 DRB2), DRB1 (e.g., VoIP) corresponding to the second UE 504 may be mapped to RLC-CH3 (e.g., RLC-Channel 3=UE2 DRB1), DRB2 (e.g., web browsing) corresponding to the second UE 504 may be mapped to RLC-CH4 (e.g., RLC-Channel 4=UE2 DRB2), DRB1 (e.g., VoIP) corresponding to the third UE 506 may be mapped to RLC-CH5 (e.g., RLC-Channel 5=UE3 DRB1), DRB2 (e.g., web browsing) corresponding to the third UE 506 may be mapped to RLC-CH6 (e.g., RLC-Channel 6=UE3 DRB2), and DRB3 (e.g., streaming) corresponding to the third UE 506 may be mapped to RLC-CH7 (e.g., RLC-Channel 7=UE3 DRB3).

In this embodiment, each UE DRB is mapped onto a separate BH RLC-channel. Furthermore, each BH RLC-channel is mapped onto a separate BH RLC-channel on a next hop (e.g., from the second IAB node 510 to the donor IAB node 512). Accordingly, the number of established BH RLC-channels is equal to the number of established UE DRBs.

In some embodiments, a BH RLC channel may be mapped onto BH LCH. The mapping association can include: one BH RLC-channel mapped onto one BH LCH; or multiple BH RLC-channels mapped onto one BH LCH.

FIG. 6 is a schematic block diagram illustrating one embodiment of a system 600 using many-to-one mapping. The system 600 includes a first UE 602 (e.g., UE1), a second UE 604 (e.g., UE2), a third UE 606 (e.g., UE3), a first IAB node 608, a second IAB node 610, and a donor JAB node 612. In this many-to-one mapping between UE DRBs and BH RLC-channels, many DRB from the UEs are mapped to one RLC channel. For example, DRB1 (e.g., VoIP) corresponding to the first UE 602, DRB1 (e.g., VoIP) corresponding to the second UE 604, and DRB1 (e.g., VoIP) corresponding to the third UE 606 may all be mapped to RLC-CH1 (e.g., RLC-Channel 1=UE1 DRB1+UE2 DRB1+UE3 DRB1), DRB2 (e.g., streaming) corresponding to the first UE 602 and DRB3 (e.g., streaming) corresponding to the third UE 606 may both be mapped to RLC-CH2 (e.g., RLC-Channel 2=UE1 DRB2+UE3 DRB3), and DRB2 (e.g., web browsing) corresponding to the second UE 604 and DRB2 (e.g., web browsing) corresponding to the third UE 606 may both be mapped to RLC-CH3 (e.g., RLC-Channel 3=UE2 DRB2+UE3 DRB2).

Thus, for the many-to-one mapping, several UE DRBs are multiplexed onto a single BH RLC-channel based on specific parameters such as a bearer QoS profile. Other information such as hop-count may also be configured. In some embodiments, the IAB node may multiplex UE DRBs into a single BH RLC-channel even if they belong to different UEs. Furthermore, a packet from one BH RLC-channel may be mapped onto a different BH RLC-Channel on the next hop.

Because a BH RLC-channel multiplexes data from and/or to multiple bearers, and possibly even different UEs, each data block transmitted in a BH RLC-channel may contain an identifier of the UE, DRB, and/or IAB node it is associated with.

Furthermore, in some embodiments, BH RLC channels may be mapped onto a BH LCH in a MAC layer. There may be several mapping options for this. In one embodiment, a one-to-one mapping is established between BH RLC channels and BH LCHs. In another embodiment, several BH RLC channels may be mapped to one LCH.

In some configurations, such as in a 5G system, one DRB may be one-to-one mapped onto RLC which is also one-to-one mapped onto LCH. Moreover, RRC may configure LCG that may include several LCHs. A BSR may be reported based on a LCG.

In various embodiments, UL BSR may be used to provide support for QoS-aware packet scheduling. In some embodiments, an UL BSR may refer to data that is buffered for a group of LCGs in a UE. In certain embodiments, UL BSRs may be transmitted using MAC signaling.

In some embodiments, a BSR may be triggered based on the following conditions: a MAC entity has new UL data available for a logical channel which belongs to a LCG; and either: the new UL data belongs to a logical channel with higher priority than the priority of any logical channel containing available UL data which belong to any LCG; or none of the logical channels which belong to an LCG contains any available UL data, in which case the BSR is referred to as "Regular BSR." In certain embodiments, UL resources may be allocated and a number of padding bits may be equal to or larger than the size of the Buffer Status Report MAC CE plus its subheader, in which case the BSR is referred to as "Padding BSR." In various embodiments, retxBSR-Timer expires, and at least one of the logical channels which belong to an LCG contains UL data, in which case the BSR is referred to as "Regular BSR." In one embodiment, periodicBSR-Timer expires, in which case the BSR is referred to as "Periodic BSR."

Various communications may be used to describe triggers that may be used in an IAB system. In a first communication, a donor IAB (e.g., CU portion) may configure an IAB node2. In one embodiment, a parameter "X" may be configured for the IAB node2.

In a second communication, the IAB node2 (e.g., DU portion) may receive UL data from a child IAB node and/or access UEs.

In some embodiments, the IAB node2 (e.g., MT portion) may determine whether a trigger condition is met. If a trigger condition is met, a buffer status (e.g., BSR) may be triggered to report the buffer status to a parent IAB node.

In certain embodiments, an IAB may transmit a periodic BSR only in response to certain conditions (e.g., trigger conditions) occurring in addition to a timer expiring. As may be appreciated, the timer expiring may also be considered a trigger condition.

In one embodiment, a trigger condition may include that a content of a BO is different from content of a previously indicated BO. In such an embodiment, the trigger condition may occur in addition to the timer expiring. As used herein, BO may be defined as a percentage of a buffer. Furthermore, the percentage of the buffer may be quantified to different levels. For example, index( ) may be associated with a range of 1% to 10%, index1 may be associated with a range of 11%-20%, and so forth. In some embodiments, a trigger condition may include that a content of a BO is different from content of a previous BO by a predetermined percentage (e.g., 1%, 2%, 5%, 10%, 20%, 50%, 75%, and so forth) and/or by a predetermined range (e.g., between 2% and 10% different, between 5% and 25% different, and so forth). In such embodiments, an index associated with a range or percentage may be used to indicate the predetermined percentage or the predetermined range. In some embodiments, BO may be associated with one or more LCGs. For example, BO may be associated with all LCGs. In various embodiments, an IAB node may know that a BO is the same as a previously indicated BO if a periodic BSR is not received by the IAB node (e.g., within a predetermined time period).

In another embodiment, a trigger condition may include that a BO is above a predetermined threshold. In such an embodiment, the trigger condition may occur in addition to the timer expiring. The predetermined threshold may be configured by RRC signaling. In such embodiments, BO may be associated with one or more LCGs. For example, BO may be associated with all LCGs. In some embodiments, an IAB node may know that a BO is below the predetermined threshold if a periodic BSR is not received by the IAB node (e.g., within a predetermined time period).

In some embodiments, a BSR may be triggered if certain trigger conditions occur even if the timer does not expire. In one embodiment, a trigger condition may include new UL data being available for a UE bearer that belongs to a LCG. In such an embodiment, the new UL data may belong to a UE bearer having a higher priority than the priority of any UE bearer containing available UL data that belongs to any LCG. In another embodiment, a trigger condition may include new UL data being available for a UE bearer that belongs to a LCG. In such an embodiment, none of the UE bearers that belong to a LCG may contain any available UL data. In some embodiments, a trigger condition may include new UL data being available for x (e.g., a configured number) UE bearers that belong to a LCG and the UL data is received before a second timer expires. In such embodiments, the new UL data may belong to x UE bearers with higher priority than the priority of any UE bearers containing available UL data that belong to any LCG. The second timer may be started at a time at which a BSR is reported. The second timer may be configured by RRC signaling. When the second timer expires and BSR is not triggered, the count for x may be set 0. As may be appreciated, x is a number that may be configured by RRC. For example, x may be 1, 2, 3, 4, 10, and so forth. In various embodiments, a trigger condition may include new UL data being available for y UE bearers that belong to a LCG before a third timer expires. In such embodiments, none of the UE bearers that belong to a LCG may contain any available UL data. The third timer may be started at a time at which a BSR is reported. The third timer may be configured by RRC signaling. When the third timer expires and BSR is not triggered, the count for y may be set 0. As may be appreciated, y is a number that may be configured by RRC. For example, y may be 1, 2, 3, 5, 12, and so forth. While some of the trigger conditions are described in relation to a UE bearer, similar triggers may be used that use a RLC channel or LCH in place of the UE bearer. In certain embodiments, a trigger condition may include a BO being above a predetermined threshold. In such embodiments, the BSR may be per LCG or for all LCGs.

In a third communication, a parent IAB node (e.g., IAB node3) may allocate UL resources to the IAB node2 (e.g., MT) for UL data transmission. The size of allocated UL resources may be based on a reported buffer status.

In a fourth communication, the IAB node 2 (e.g., MT) may schedule the resources for the UL data pending in the buffer and may transmit the UL data.

Figure 7:
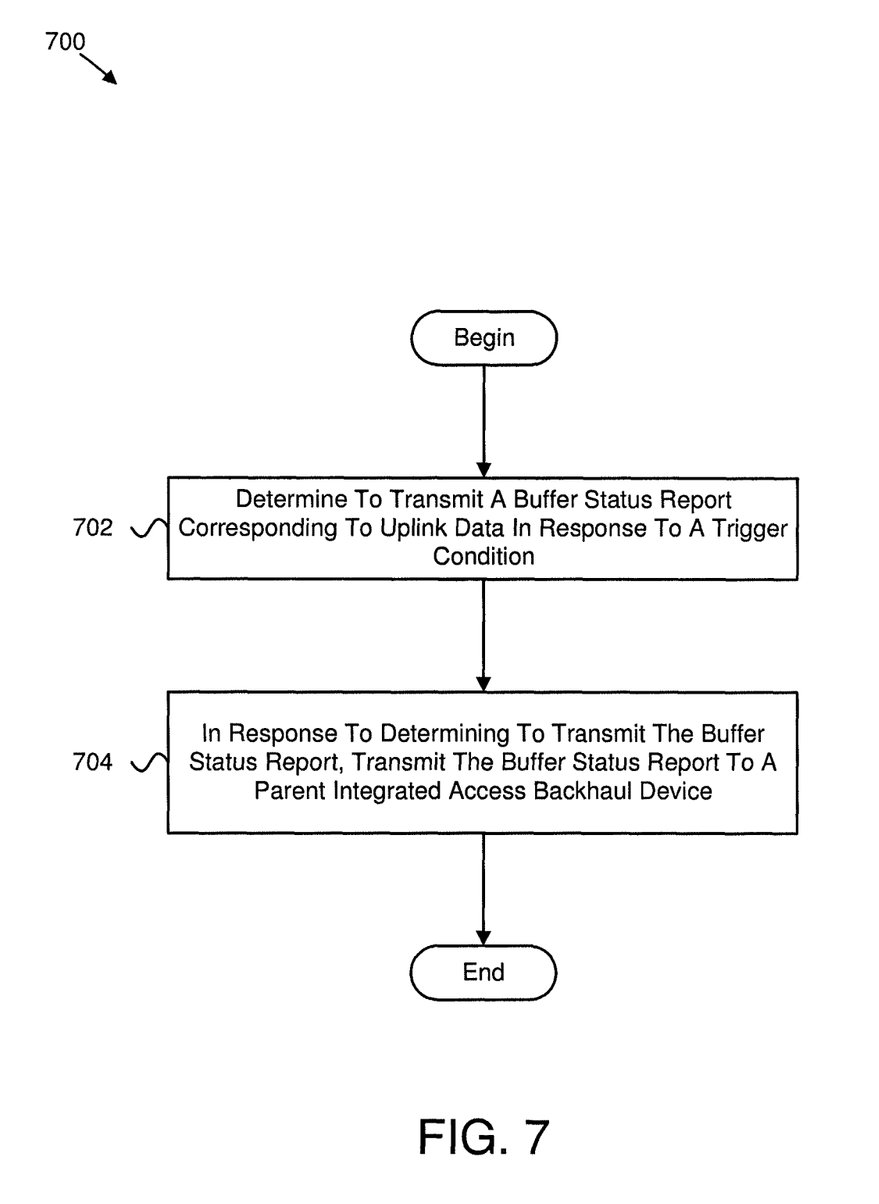
FIG. 7 is a schematic flow chart diagram illustrating one embodiment of a method for triggering a buffer status report.

FIG. 7 is a schematic flow chart diagram illustrating one embodiment of a method 700 for triggering a buffer status report. In some embodiments, the method 700 is performed by an apparatus, such as the remote unit 102 or the network unit 104 (e.g., IAB node). In certain embodiments, the method 700 may be performed by a processor executing program code, for example, a microcontroller, a microprocessor, a CPU, a GPU, an auxiliary processing unit, a FPGA, or the like.

The method 700 may include determining 702 to transmit a buffer status report corresponding to uplink data in response to a trigger condition. In certain embodiments, the method 700 includes, in response to determining to transmit the buffer status report, transmitting 704 the buffer status report to a parent integrated access backhaul device.

In various embodiments, the method 700 comprises receiving the uplink data at a remote unit or an integrated access backhaul device. In some embodiments, transmitting the buffer status report comprises transmitting the buffer status report in response to multiple remote unit bearers being multiplexed into one logical channel. In certain embodiments, the trigger condition comprises a timer corresponding to the buffer status report expiring and a first content of a current buffer occupancy differing from a second content of a previous buffer occupancy.

In one embodiment, the trigger condition comprises the first content being different from the second content by a predetermined percentage range. In various embodiments, the predetermined percentage range is indicated by an index value corresponding to the predetermined percentage range.

In some embodiments, the current buffer occupancy and the previous buffer occupancy are associated with at least one logical channel group.

In certain embodiments, the parent integrated access backhaul device determines that the first content and the second content are the same in response to not receiving the buffer status report. In one embodiment, the trigger condition comprises a timer corresponding to the buffer status report expiring and a buffer occupancy exceeding a predetermined threshold. In various embodiments, the predetermined threshold is configured by radio resource control signaling.

In some embodiments, the buffer occupancy is associated with at least one logical channel group. In certain embodiments, the parent integrated access backhaul device determines that the buffer occupancy is less than the predetermined threshold in response to not receiving the buffer status report. In one embodiment, the trigger condition comprises determining that new uplink data is available for a bearer that belongs to a logical channel group, and the bearer has a priority higher than other bearers having available uplink data that belong to any logical channel group.

In various embodiments, the trigger condition comprises determining that new uplink data is available for a bearer that belongs to a logical channel group, and other bearers that belong to any logical channel group do not have available uplink data. In some embodiments, the trigger condition comprises determining that new uplink data is available for a predetermined number of bearers that belong to a logical channel group prior to expiration of a timer, and the predetermined number of bearers has a priority higher than other bearers having available uplink data that belong to any logical channel group. In certain embodiments, the timer is started in response to transmitting a prior buffer status report.

In one embodiment, the timer is configured by radio resource control signaling. In various embodiments, the method 700 comprises, in response to the expiration of the timer and the trigger condition not occurring, setting the predetermined number of bearers equal to zero. In some embodiments, the predetermined number of bearers is configured by radio resource control signaling.

In certain embodiments, the trigger condition comprises determining that new uplink data is available for a predetermined number of bearers that belong to a logical channel group prior to expiration of a timer, other bearers that belong to any logical channel group do not have available uplink data. In one embodiment, the timer is started in response to transmitting a prior buffer status report. In various embodiments, the timer is configured by radio resource control signaling.

In some embodiments, the method 700 comprises, in response to the expiration of the timer and the trigger condition not occurring, setting the predetermined number of bearers equal to zero. In certain embodiments, the predetermined number of bearers is configured by radio resource control signaling. In one embodiment, the trigger condition comprises a buffer occupancy exceeding a predetermined threshold. In various embodiments, the buffer occupancy is for one logical channel group. In some embodiments, the buffer occupancy is for all logical channel groups.

In one embodiment, a method comprises: determining to transmit a buffer status report corresponding to uplink data in response to a trigger condition; and in response to determining to transmit the buffer status report, transmitting the buffer status report to a parent integrated access backhaul device.

In various embodiments, the method comprises receiving the uplink data at a remote unit or an integrated access backhaul device.

In some embodiments, transmitting the buffer status report comprises transmitting the buffer status report in response to multiple remote unit bearers being multiplexed into one logical channel.

In certain embodiments, the trigger condition comprises a timer corresponding to the buffer status report expiring and a first content of a current buffer occupancy differing from a second content of a previous buffer occupancy.

In one embodiment, the trigger condition comprises the first content being different from the second content by a predetermined percentage range.

In various embodiments, the predetermined percentage range is indicated by an index value corresponding to the predetermined percentage range.

In some embodiments, the current buffer occupancy and the previous buffer occupancy are associated with at least one logical channel group.

In certain embodiments, the parent integrated access backhaul device determines that the first content and the second content are the same in response to not receiving the buffer status report.

In one embodiment, the trigger condition comprises a timer corresponding to the buffer status report expiring and a buffer occupancy exceeding a predetermined threshold.

In various embodiments, the predetermined threshold is configured by radio resource control signaling.

In some embodiments, the buffer occupancy is associated with at least one logical channel group.

In certain embodiments, the parent integrated access backhaul device determines that the buffer occupancy is less than the predetermined threshold in response to not receiving the buffer status report.

In one embodiment, the trigger condition comprises determining that new uplink data is available for a bearer that belongs to a logical channel group, and the bearer has a priority higher than other bearers having available uplink data that belong to any logical channel group.

In various embodiments, the trigger condition comprises determining that new uplink data is available for a bearer that belongs to a logical channel group, and other bearers that belong to any logical channel group do not have available uplink data.

In some embodiments, the trigger condition comprises determining that new uplink data is available for a predetermined number of bearers that belong to a logical channel group prior to expiration of a timer, and the predetermined number of bearers has a priority higher than other bearers having available uplink data that belong to any logical channel group.

In certain embodiments, the timer is started in response to transmitting a prior buffer status report.

In one embodiment, the timer is configured by radio resource control signaling.

In various embodiments, the method comprises, in response to the expiration of the timer and the trigger condition not occurring, setting the predetermined number of bearers equal to zero.

In some embodiments, the predetermined number of bearers is configured by radio resource control signaling.

In certain embodiments, the trigger condition comprises determining that new uplink data is available for a predetermined number of bearers that belong to a logical channel group prior to expiration of a timer, other bearers that belong to any logical channel group do not have available uplink data.

In one embodiment, the timer is started in response to transmitting a prior buffer status report.

In various embodiments, the timer is configured by radio resource control signaling.

In some embodiments, the method comprises, in response to the expiration of the timer and the trigger condition not occurring, setting the predetermined number of bearers equal to zero.

In certain embodiments, the predetermined number of bearers is configured by radio resource control signaling.

In one embodiment, the trigger condition comprises a buffer occupancy exceeding a predetermined threshold.

In various embodiments, the buffer occupancy is for one logical channel group.

In some embodiments, the buffer occupancy is for all logical channel groups.

In one embodiment, an apparatus comprises: a processor that determines to transmit a buffer status report corresponding to uplink data in response to a trigger condition; and a transmitter that, in response to determining to transmit the buffer status report, transmits the buffer status report to a parent integrated access backhaul device.

In various embodiments, the apparatus comprises a receiver that receives the uplink data at a remote unit or an integrated access backhaul device.

In some embodiments, the transmitter transmits the buffer status report by transmitting the buffer status report in response to multiple remote unit bearers being multiplexed into one logical channel.

In certain embodiments, the trigger condition comprises a timer corresponding to the buffer status report expiring and a first content of a current buffer occupancy differing from a second content of a previous buffer occupancy.

In one embodiment, the trigger condition comprises the first content being different from the second content by a predetermined percentage range.

In various embodiments, the predetermined percentage range is indicated by an index value corresponding to the predetermined percentage range.

In some embodiments, the current buffer occupancy and the previous buffer occupancy are associated with at least one logical channel group.

In certain embodiments, the parent integrated access backhaul device determines that the first content and the second content are the same in response to not receiving the buffer status report.

In one embodiment, the trigger condition comprises a timer corresponding to the buffer status report expiring and a buffer occupancy exceeding a predetermined threshold.

In various embodiments, the predetermined threshold is configured by radio resource control signaling.

In some embodiments, the buffer occupancy is associated with at least one logical channel group.

In certain embodiments, the parent integrated access backhaul device determines that the buffer occupancy is less than the predetermined threshold in response to not receiving the buffer status report.

In one embodiment, the trigger condition comprises determining that new uplink data is available for a bearer that belongs to a logical channel group, and the bearer has a priority higher than other bearers having available uplink data that belong to any logical channel group.

In various embodiments, the trigger condition comprises determining that new uplink data is available for a bearer that belongs to a logical channel group, and other bearers that belong to any logical channel group do not have available uplink data.

In some embodiments, the trigger condition comprises determining that new uplink data is available for a predetermined number of bearers that belong to a logical channel group prior to expiration of a timer, and the predetermined number of bearers has a priority higher than other bearers having available uplink data that belong to any logical channel group.

In certain embodiments, the timer is started in response to transmitting a prior buffer status report.

In one embodiment, the timer is configured by radio resource control signaling.

In various embodiments, the processor, in response to the expiration of the timer and the trigger condition not occurring, sets the predetermined number of bearers equal to zero.

In some embodiments, the predetermined number of bearers is configured by radio resource control signaling.

In certain embodiments, the trigger condition comprises determining that new uplink data is available for a predetermined number of bearers that belong to a logical channel group prior to expiration of a timer, other bearers that belong to any logical channel group do not have available uplink data.

In one embodiment, the timer is started in response to transmitting a prior buffer status report.

In various embodiments, the timer is configured by radio resource control signaling.

In some embodiments, the processor, in response to the expiration of the timer and the trigger condition not occurring, sets the predetermined number of bearers equal to zero.

In certain embodiments, the predetermined number of bearers is configured by radio resource control signaling.

In one embodiment, the trigger condition comprises a buffer occupancy exceeding a predetermined threshold.

In various embodiments, the buffer occupancy is for one logical channel group.

In some embodiments, the buffer occupancy is for all logical channel groups.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining to transmit a buffer status report corresponding to uplink data in response to a trigger condition, wherein the trigger condition comprises determining that new uplink data is available for a predetermined number of bearers that belong to a logical channel group prior to expiration of a timer, the predetermined number of bearers has a priority higher than other bearers having available uplink data that belong to any logical channel group, and the predetermined number of bearers is configured by radio resource control signaling,
   in response to the expiration of the timer and the trigger condition not occurring, setting the predetermined number of bearers equal to zero; and in response to determining to transmit the buffer status report, transmitting the buffer status report to a parent integrated access backhaul device.

2. The method of claim 1, further comprising receiving the uplink data at a remote unit or an integrated access backhaul device.

3. The method of claim 1, wherein transmitting the buffer status report comprises transmitting the buffer status report in response to multiple remote unit bearers being multiplexed into one logical channel.

4. The method of claim 1, wherein the trigger condition comprises a first content of a current buffer occupancy differing from a second content of a previous buffer occupancy.

5. The method of claim 4, wherein the trigger condition comprises the first content being different from the second content by a predetermined percentage range.

6. The method of claim 5, wherein the predetermined percentage range is indicated by an index value corresponding to the predetermined percentage range.

7. The method of claim 4, wherein the current buffer occupancy and the previous buffer occupancy are associated with at least one logical channel group.

8. The method of claim 4, wherein the parent integrated access backhaul device determines that the first content and the second content are the same in response to not receiving the buffer status report.

9. The method of claim 1, wherein the trigger condition comprises a buffer occupancy exceeding a predetermined threshold.

10. The method of claim 9, wherein:
the predetermined threshold is configured by radio resource control signaling;
the buffer occupancy is associated with at least one logical channel group;
the parent integrated access backhaul device determines that the buffer occupancy is less than the predetermined threshold in response to not receiving the buffer status report; or
some combination thereof.

11. The method of claim 1, wherein the trigger condition comprises determining that new uplink data is available for a bearer that belongs to a logical channel group, and the bearer has a priority higher than other bearers having available uplink data that belong to any logical channel group.

12. The method of claim 1, wherein the trigger condition comprises determining that new uplink data is available for a bearer that belongs to a logical channel group, and other bearers that belong to any logical channel group do not have available uplink data.

13. The method of claim 1, wherein the timer is started in response to transmitting a prior buffer status report, the timer is configured by radio resource control signaling, or a combination thereof.

14. The method of claim 1, wherein the timer is started in response to transmitting a prior buffer status report, the timer is configured by radio resource control signaling, or a combination thereof.

15. The method of claim 1, wherein the trigger condition comprises a buffer occupancy exceeding a predetermined threshold, and the buffer occupancy is for one logical channel group or all logical channel groups.

16. An apparatus comprising:

a processor that:

determines to transmit a buffer status report corresponding to uplink data in response to a trigger condition, wherein the trigger condition comprises determining that new uplink data is available for a predetermined number of bearers that belong to a logical channel group prior to expiration of a timer, the predetermined number of bearers has a priority higher than other bearers having available uplink data that belong to any logical channel group, and the predetermined number of bearers is configured by radio resource control signaling; and in response to the expiration of the timer and the trigger condition not occurring, sets the predetermined number of bearers equal to zero; and a transmitter that, in response to determine to transmit the buffer status report, transmits the buffer status report to a parent integrated access backhaul device.

* * * * *